July 27, 1937.     K. L. LANNINGER     2,087,916
PIPE JOINT
Filed Aug. 20, 1935     3 Sheets-Sheet 1
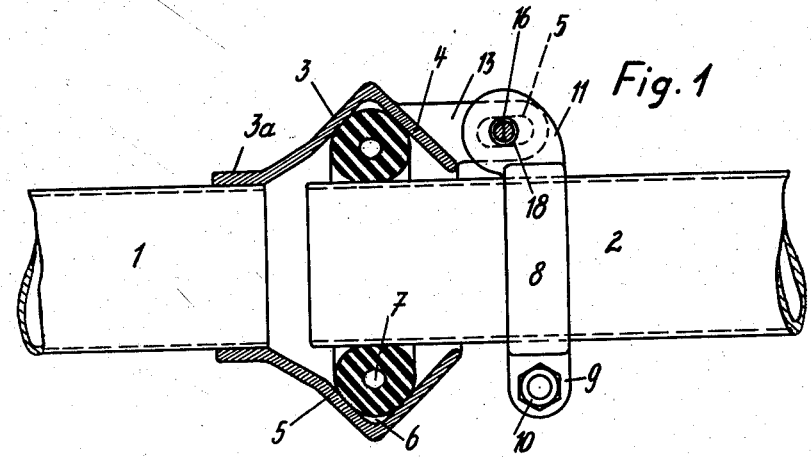
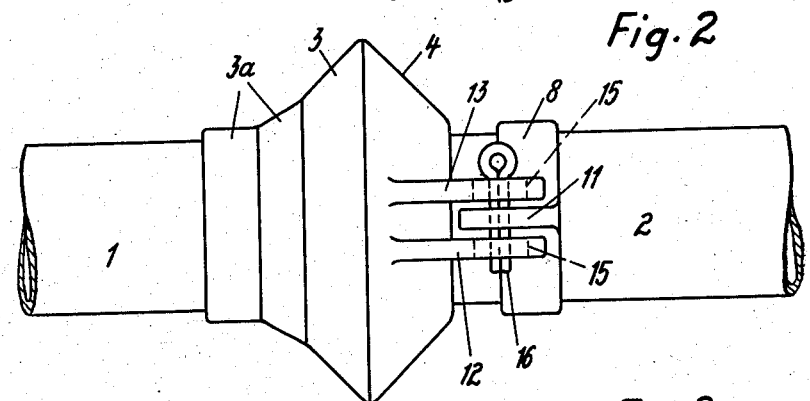
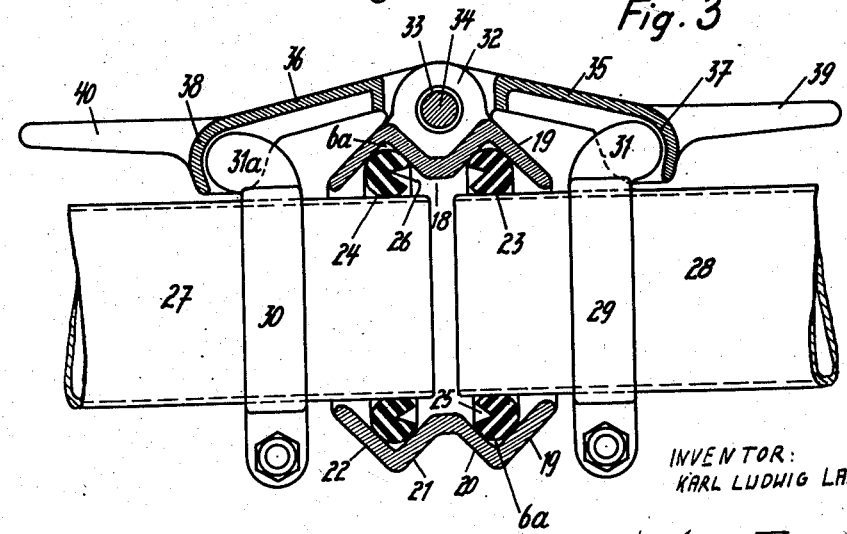
INVENTOR:
KARL LUDWIG LANNINGER
his Attorney.

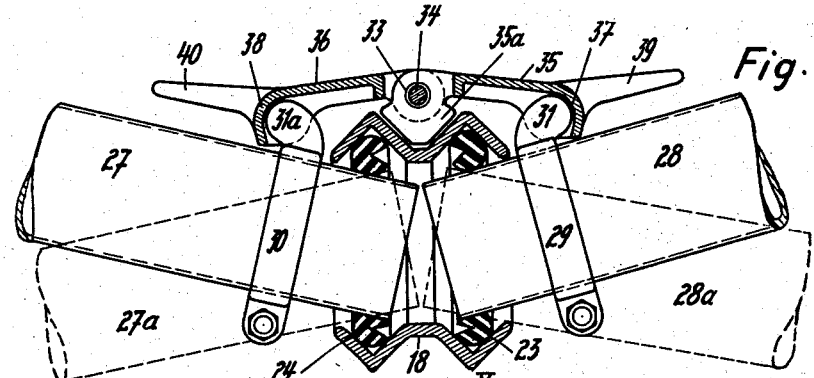
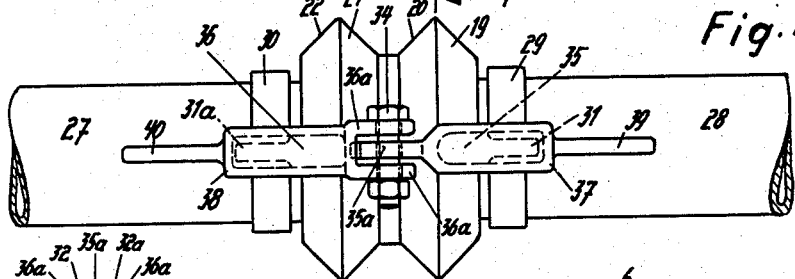
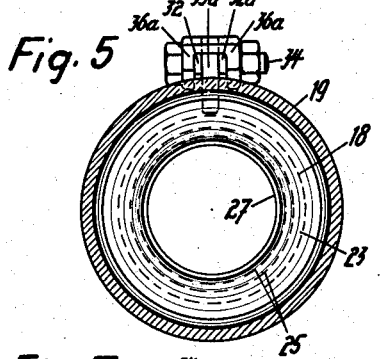
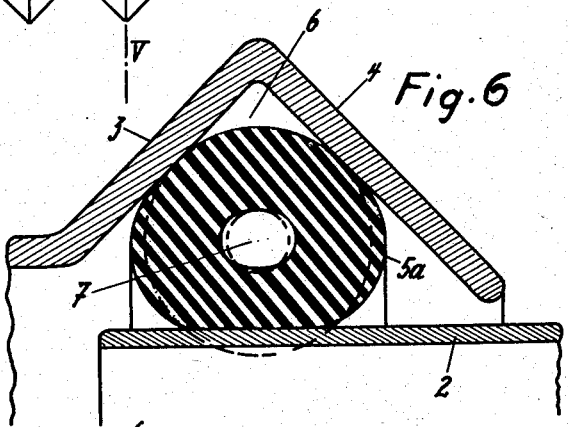
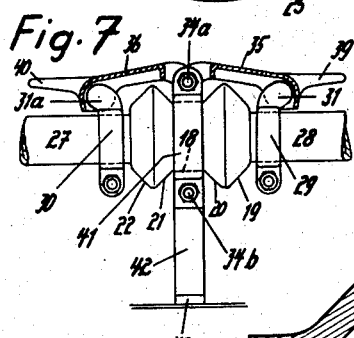
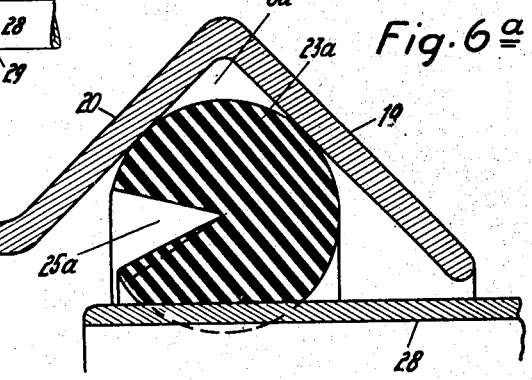

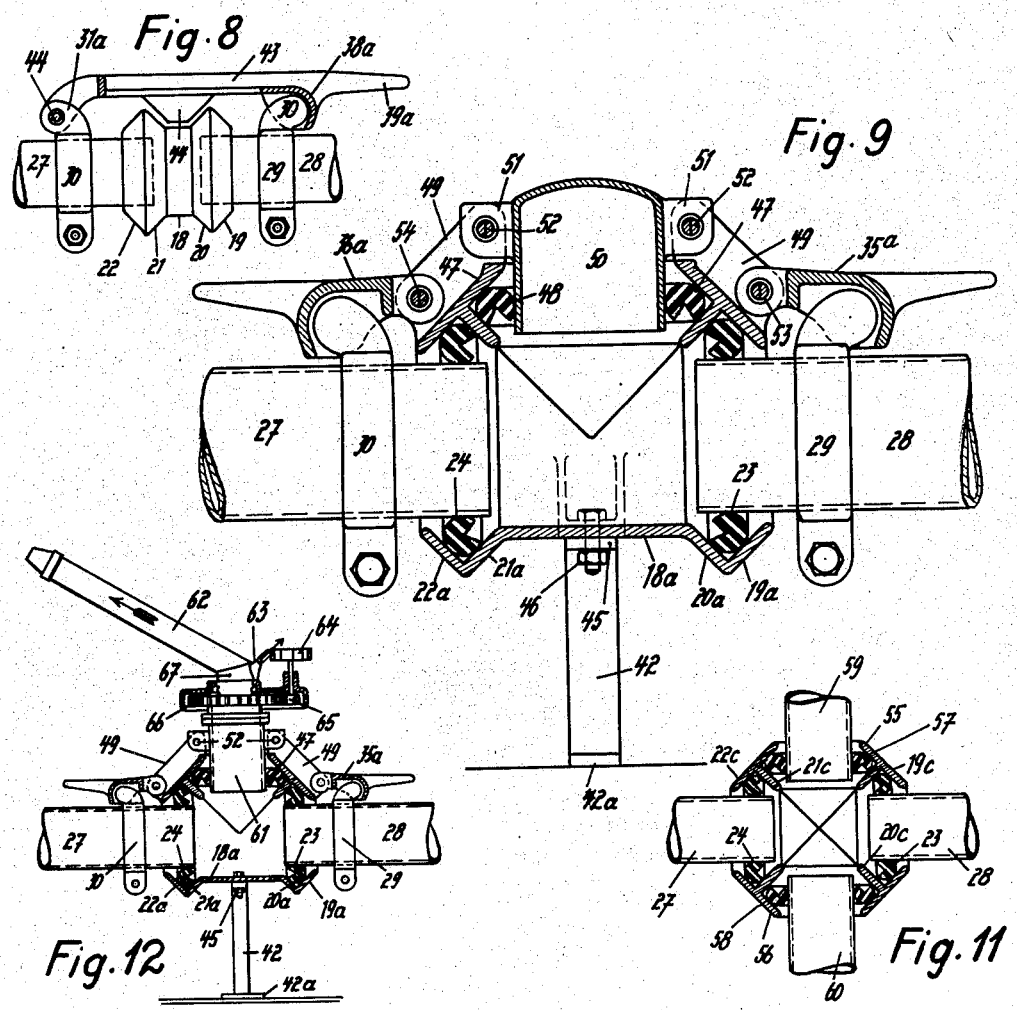
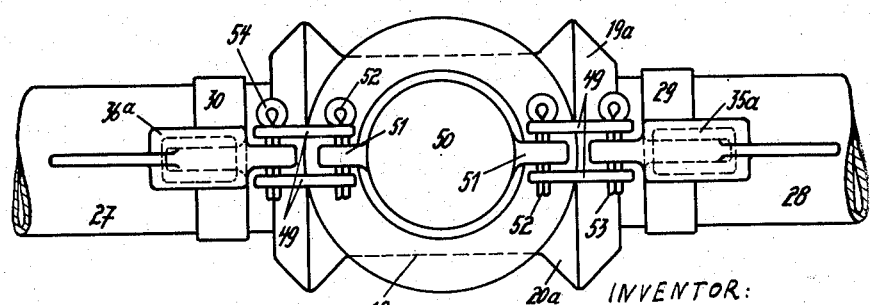

Patented July 27, 1937

2,087,916

UNITED STATES PATENT OFFICE 2,087,916

PIPE JOINT

Karl Ludwig Lanninger, Frankfort-on-the-Main-Rodelheim, Germany

Application August 20, 1935, Serial No. 36,960
In Germany September 1, 1934

9 Claims. (Cl. 285—90)

This invention relates to a pipeline for conducting fluids, especially a pipeline wherein the joints of neighbouring pipes are bridged by an easily detachable coupling sleeve, that is a pipeline provided with so-called rapid couplings. Such pipelines, when they are intended for sprinkling, spraying, fire extinction, feeding of compressed air in tunnels, surface and deep mine workings and the like, must allow an accurate packing and of any desired bending at the coupling points in order to enable the pipeline to be laid even in hilly country or on uneven ground. At the same time such pipelines, in order to keep the costs of production and maintenance as low as possible, must be equipped with simply constructed packing means which can be introduced without difficulty.

The pipeline according to the invention fulfills all these requirements especially as it allows the pipeline to be used for very many purposes merely on account of the peculiar structure of the rapid coupling employed.

Several embodiments of the invention are illustrated by way of example in the accompanying drawings in which:—

Fig. 1 shows in longitudinal section a form of construction of a coupling of a pipeline for conducting liquids and gases with rubber ring packing.

Fig. 2 is a top plan view of Fig. 1.

Fig. 3 shows in longitudinal section a second form of construction of a coupling of two coaxial pipes with sector-shaped rubber ring packings.

Fig. 3a is a similar view to Fig. 3 showing the two pipes connected by the coupling in angular position.

Fig. 4 is a top plan view of Fig. 3a.

Fig. 5 is a cross section on line V—V of Fig. 4 viewed in the direction of the arrow P.

Fig. 6 is a part cross section on a larger scale through the rubber packing of the construction shown in Figs. 1 and 2, showing the deformation of the rubber ring clamped in the coupling sleeve.

Fig. 6a is a similar view to Fig. 6 showing a rubber packing ring with sector-shaped recess.

Fig. 7 shows in elevation partly in section a coupling of a pipeline corresponding to Figs. 3 and 4, with a support secured to the coupling.

Fig. 8 shows in part side elevation another form of connection of the coupling.

Fig. 9 shows in longitudinal section a pipeline in which a bell is inserted in the coupling adapted to be replaced by a branch pipe.

Fig. 10 is a top plan view of Fig. 9.

Fig. 11 shows in longitudinal section on a smaller scale another form of construction of a coupling of a pipeline with pipes branching upwards and downwards from the coupling.

Fig. 12 is a longitudinal section through a pipeline with a coupling resting on a support and with a liquid jet projector oscillatable in a circle and extending from this coupling.

According to Figs. 1 and 2, the pipeline, of which only a portion is illustrated with a joint, consists of pipes 1 and 2. The coupling is formed by a double hollow cone casing 3, 4 the part 3 of which extends into a sleeve 3a screwed or welded on to the end of the pipe 1. A round rubber ring 5 having a central bore 7 is inserted in the hollow cone casing and leaves a hollow space 6 between its outer circumference and the apex of the hollow cone of the casing. The pipe 2 is slipped into the rubber ring thereby deforming the round shape of the rubber ring 5 into an oval shape 5a, that is the rubber ring is pressed into the coupling casing (see Fig. 6) and effects an exceptionally tight packing. The pipe 2 carries a clip 8 the arms 9 of which are pressed together by a screw 10, to fix the clip tightly on the pipe. The clip 8 has on its side opposite the arms a projection 11 which projects between lugs 12, 13 on the casing wall 4. A bolt 16 guided in longitudinal slots 15 of the lugs 13, 14 extends through a bore 17 in the projection 11 of the clip so that the pipe 2 is hingedly connected to the pipe 1.

In the form of construction illustrated in Figs. 3, 3a and 4 the coupling casing is composed of two hollow cones 19, 20 and 21, 22 symmetrically arranged to a medial zone 18. Each of the hollow cones accommodates a rubber packing ring 23, 24 having a sector-shaped edge recess 25, 26. When the pipes 27, 28 are slipped into the rubber rings, the sectors 25, 26 are reduced in size and the rings themselves pressed into the recesses of the casing parts 19, 20 and 21, 22 in such a manner that they assume the shape 25a (Fig. 6a). However, a space 6a remains between the outer circumference of the rubber packing rings 23, 24 and the apices of the conical portions of the casing.

A clip 29, 30 is mounted on each of the pipes 27, 28, this clip being of similar construction to that shown in Figs. 1 and 2 only the curved projections 31, 31a extend in opposite directions. The narrowed medial zone 18 of the coupling casing has a bracket 32 in the bore 33 of which a bolt 34 is inserted. Two pawls 35, 36 can rotate about this bolt.

The form of construction shown in Figs. 3a and 4 differs from that illustrated in Fig. 3 in that the bolt 34 does not rest in a bracket in the medial zone 18 but is only carried by the pawls 35, 36, the pawl 35 being provided with a cam like extension 35a the shape of which is adapted to that of the medial zone. The cam-like extension 35a is embraced by two bifurcated parts 36a of the pawl 36 which is forked at its end adjacent the bolt, so that the pawls 35, 36 are hingedly mounted on the bolt 34. The pawls have claw-shaped heads 37, 38, which partly embrace the projections 31, 31a, and arms 39, 40 for lifting them out of engagement and bringing them into engagement with the projections 31, 31a. As can be seen from Fig. 3a the pipeline can be bent to a considerable extent so that the pipes 27, 28 may be brought into the position 27a, 28a. This is rendered possible by the shape and arrangement of the rubber rings. Owing to the fact that spaces 6, 6a remain between the periphery of the rings and the apices of the hollow cones, the rings penetrate more deeply into the hollow cones when the pipes are out of alignment. However, this bending is also possible because the rubber rings are mounted directly behind the inlet aperture of the coupling, that is the outer walls of the hollow cones of the casing are packing elements. The advantages of the rubber ring according to the invention consists in that it has a hollow space in its interior or a sector-shaped recess in its edge. This hollow space very considerably increases the elasticity of the rubber ring, thereby greatly facilitating the coupling and uncoupling of the pipes in the casing. However, the most important point is, that a tight closure is already obtained by the specific tension of the rubber ring, without it being necessary for the liquid conducted through the pipeline to be under pressure. Thus, losses of fluid conveyed are avoided at the joints even when the conduit is being filled.

Moreover, the mounting of the pawls effects a one-point-fixation on the coupling casing both in the constructions illustrated in Figs. 3, 3a and 4 and also in that shown in Figs. 1 and 2. The form of construction according to Figs. 3, 3a and 4, however, presents the advantage as compared with that of Figs. 1 and 2, that the coupling is of absolutely symmetrical shape and the claw bearing of the engaging levers allows an abundant play for a considerable deflection. Furthermore, the projections 31 and 31a may also be connected with the pawls 35, 36 by bolts if the coupling is to remain on the pipeline during transport.

The form of construction illustrated in Fig. 7 is similar to that shown in Figs. 3, 3a and 4 this being rendered more apparent by the references applied to the individual parts, so that further explanation is not necessary. However, the coupling is at the same time constructed as supporting stand for the pipeline. For this purpose the medial narrowing 18 of the coupling casing is embraced by a two-part clip 41. The bolt 34a holding together one pair of arms of the clip carries the pawls 35 and 36, and the bolt 34b holding the other pair of arms is mounted on the head of an upright 42 with foot 42a.

The form of construction shown in Fig. 8 is likewise substantially similar to that illustrated in Figs. 3, 3a and 4, the difference consisting merely in the substitution of a single pawl 43 for the two pawls. The pawl 43 is hingedly connected by a bolt 44 with the projection 31a and its claw 37a engages over the projection 31 of the clip 29. An arm 39a serves for engaging and disengaging the pawl, which is centered relatively to the coupling casing by a cam 44 of a shape corresponding to the conical inclination of the parts 19, 20 and 21, 22.

When the coupling is to be used at the same time for connecting to a hydrant, it is constructed as shown in Fig. 9. In this instance the medial zone 18a of the casing is lengthened and supported by a support composed of a head bar 45, a foot bar 42a and uprights 42, this support being connected with the coupling casing by bolts 46. The hollow conical portions 19a, 20a and 21a, 22a form a flange 47 in which a bell 50 is inserted which is to be removed when a hydrant is to be introduced into the coupling. To ensure a tight joint between the bell or hydrant and the casing a rubber packing ring 48 is clamped in the throat produced between the flange 47 and the cone walls 20a, 21a. The flange has pans of ribs 49 which are connected at one end to the lugs 51 of the bell by pins 52 and at the other end carrying pawls 35a, 36a attached by pins 53 and 54, these pawls connecting the coupling with the clips 29, 30 on the pipes 27, 28 in the same way as that described in connection with the form of construction illustrated in Figs. 3, 3a and 4.

If branch pipes are to extend from the pipeline perpendicularly thereto, the coupling is constructed as shown in Fig. 11. The casing is then similar to that shown in Fig. 9 but the underside is of the same construction as the upper side. The cone portions 19c, 20c and 21c, 22c, in which the rubber rings 23, 24 are clamped, have flanges 55 and 56 between which and the cone walls 20c and 21c rubber rings 57, 58 are clamped. Whilst the pipes 27, 28 are slipped into the rubber rings 23, 24 and are packed thereby, branch pipes 59 and 60 are introduced into the rubber rings 57 and 58 perpendicularly to the pipes 27, 28.

A rotary jet sprinkler can be fitted in the coupling casing instead of a hydrant or some other tapping device, cock, hose or the like. This construction is shown in Fig. 12. A vertical arm 67 of a spray pipe 62 bent at an angle, rotates in a pipe 61 inserted in the casing shown in Fig. 9. This is effected in known manner by a turbine 64 which is rotated by a jet projected from a nozzle 63 in the bend of the spray pipe 62 and this turbine 64 drives through the intermediary of a pinion 65 a toothed wheel 66 fixed on the vertical arm 67.

The double hollow cone parts of the casing make this casing strong and at the same time save material. The casing may be made of sheet iron, light metal, cast steel, grey iron and other alloys, it may, however, also be made of wood, porcelain, earthenware or the like. In any case the double hollow cone parts enable the casing to be of very compact construction.

I claim:—

1. A pipe joint comprising in combination with pipes, a rigid coupling sleeve for coupling the pipe ends, said coupling sleeve being provided with at least one groove of angular cross-section being substantially symmetrical to an axis vertical to the longitudinal axis of the pipes, at least one elastic packing ring having a circular cross-section, said packing ring tightly fitting around the pipe end and being arranged in said groove of angular cross-section forming a space between its periphery and the point of the angular cross-section and being pressed into said groove against said point in a direction vertical to the longitudinal axis of the pipe, and means connecting the coupling sleeve with each of the pipe ends.

2. A pipe joint comprising in combination with pipes, a rigid coupling sleeve for coupling the pipe ends, said coupling sleeve being provided with at least one groove of angular cross-section being substantially symmetrical to an axis vertical to the longitudinal axis of the pipes, at least one elastic packing ring having a circular cross-section and being provided with a circular recess, said packing ring tightly fitting around the pipe end and being arranged in said groove of angular cross-section forming a space between its periphery and the point of the angular cross-section and being pressed into said groove against said point in a direction vertical to the longitudinal axis of the pipe, and means connecting the coupling sleeve with each of the pipe ends.

3. A pipe joint comprising in combination with pipes, a rigid coupling sleeve for coupling the pipe ends, said coupling sleeve being provided with at least one groove of angular cross-section being substantially symmetrical to an axis vertical to the longitudinal axis of the pipes, at least one elastic packing ring having a circular cross-section, said packing ring tightly fitting around the pipe end and being arranged in said groove of angular cross-section forming a space between its periphery and the point of the angular cross-section and being pressed into said groove against said point in a direction vertical to the longitudinal axis of the pipe, one end of said coupling sleeve being firmly connected to one of the pipe ends, and a split ring fastened to the other pipe end and hinged to the free end of said coupling sleeve.

4. A pipe joint comprising in combination with pipes, a rigid coupling sleeve for coupling the pipe ends, said coupling sleeve being provided with two grooves of angular cross-sections being substantially symmetrical to an axis vertical to the longitudinal axis of the pipes, a bracket arranged between said grooves, two elastic packing rings having circular cross-sections, each of said packing rings tightly fitting around a pipe end and being disposed in said groove of angular cross-section forming a space between its periphery and the point of the angular cross-section and being pressed into said groove against said point in a direction vertical to the longitudinal axis of the pipe, two split rings fastened to each of the pipe ends, and two locking means pivoted to said bracket, each of which being engaged with a split ring.

5. A pipe joint comprising in combination with pipes, a rigid coupling sleeve for coupling the pipe ends, said coupling sleeve being provided with two grooves of angular cross-sections and an intermediate neck-like zone inbetween, each of said grooves being substantially symmetrical to an axis vertical to the longitudinal axis of the pipes, two elastic packing rings having circular cross-sections, each of said packing rings tightly fitting around a pipe end and being disposed in said groove of angular cross-section forming a space between its periphery and the point of the angular cross-section and being pressed into said groove against said point in a direction vertical to the longitudinal axis of the pipe, a member engaging with said neck-like zone of the coupling sleeve, two split rings fastened to each of the pipe ends, and two locking means pivoted to said member, each of which being engaged with a split ring.

6. A pipe joint comprising in combination with pipes, a rigid coupling sleeve for coupling the pipe ends, said coupling sleeve being provided with two grooves of angular cross-sections and an intermediate neck-like zone inbetween, each of said grooves being substantially symmetrical to an axis vertical to the longitudinal axis of the pipes, two elastic packing rings having circular cross-sections, each of said packing rings tightly fitting around a pipe end and being disposed in said groove of angular cross-section forming a space between its periphery and the point of the angular cross-section and being pressed into said groove against said point in a direction vertical to the longitudinal axis of the pipe, a clip embracing said neck-like zone of the coupling sleeve, a support attached to said clip, two split rings fastened to each of the pipe ends, and two locking means pivoted to said clip, each of which being engaged with a split ring.

7. A pipe joint comprising in combination with pipes, a rigid coupling sleeve for coupling the pipe ends, said coupling sleeve being provided with two grooves of angular cross-sections and an intermediate neck-like zone inbetween, each of said grooves being substantially symmetrical to an axis vertical to the longitudinal axis of the pipes, two elastic packing rings having circular cross-sections, each of said packing rings tightly fitting around a pipe end and being disposed in said groove of angular cross-section forming a space between its periphery and the point of the angular cross-section and being pressed into said groove against said point in a direction vertical to the longitudinal axis of the pipe, a support attached to the intermediate zone, said intermediate zone being provided with an aperture, a groove of angular cross-section at the edge of said aperture, a bell inserted in said aperture, an elastic packing ring of circular cross-section tightly fitting around the end of each bell and being arranged in said groove of angular cross-section, said bell being connected to said coupling sleeve, two split rings fastened to each of the pipe ends, and two locking means pivoted to said coupling sleeve, each of which being engaged with a split ring.

8. A pipe joint comprising in combination with pipes, a rigid coupling sleeve for coupling the pipe ends, said coupling sleeve being provided with two grooves of angular cross-sections and an intermediate neck-like zone inbetween, each of said grooves being substantially symmetrical to an axis vertical to the longitudinal axis of the pipes, two elastic packing rings having circular cross-sections, each of said packing rings tightly fitting around a pipe end and being disposed in said groove of angular cross-section forming a space between its periphery and the point of the angular cross-section and being pressed into said groove against said point in a direction vertical to the longitudinal axis of the pipe, said intermediate zone being provided with two apertures, grooves of angular cross-sections at the ends of each aperture, a pipe end inserted in each of said apertures, and elastic packing rings of circular cross-sections tightly fitting around the pipe ends in said apertures and being arranged in said grooves of angular cross-sections.

9. A pipe joint comprising in combination with pipes, a rigid coupling sleeve for coupling the pipe ends, said coupling sleeve being provided with two grooves of angular cross-sections and an intermediate neck-like zone inbetween, each of said grooves being substantially symmetrical to an axis vertical to the longitudinal axis of the pipes, two elastic packing rings having circular cross-sections, each of said packing rings tightly fitting around a pipe end and being disposed in said groove of angular cross-section forming a space between its periphery and the point of the angular cross-section and being pressed into said groove against said point in a direction vertical to the longitudinal axis of the pipe, a support attached to the intermediate zone, said intermediate zone being provided with an aperture, a groove of angular cross-section at the edge of said aperture, a sprinkler having a pipe-like inlet end, the inlet end of said sprinkler being inserted in said aperture, an elastic packing ring of circular cross-section tightly fitting around said inlet end and being arranged in said groove of angular cross-section, said sprinkler being connected to said coupling sleeve, two split rings fastened to each of the pipe ends, and two locking means pivoted to said coupling sleeve, each of which being engaged with a split ring.

KARL LUDWIG LANNINGER.